United States Patent
Marchthaler

(10) Patent No.: US 7,383,113 B2
(45) Date of Patent: Jun. 3, 2008

(54) METHOD AND SYSTEM IN THE CLASSIFICATION OF OBJECTS OCCUPYING A SEAT

(75) Inventor: Reiner Marchthaler, Gingen (DE)

(73) Assignee: Robert Bosch GmbH, Stuttgart (DE)

( * ) Notice: Subject to any disclaimer, the term of this patent is extended or adjusted under 35 U.S.C. 154(b) by 693 days.

(21) Appl. No.: 10/512,727

(22) PCT Filed: Feb. 26, 2003

(86) PCT No.: PCT/DE03/00615

§ 371 (c)(1),
(2), (4) Date: Oct. 26, 2004

(87) PCT Pub. No.: WO2004/016476

PCT Pub. Date: Feb. 26, 2004

(65) Prior Publication Data
US 2005/0119812 A1    Jun. 2, 2005

(30) Foreign Application Priority Data
Jul. 20, 2002   (DE)   ............................ 102 33 098

(51) Int. Cl.
*B60R 21/01*   (2006.01)
*G06F 17/00*   (2006.01)

(52) U.S. Cl. ................. 701/45; 701/46; 701/124; 180/271; 340/667

(58) Field of Classification Search ............ 701/45, 701/46, 124; 702/102, 127; 280/735; 180/271; 340/667
See application file for complete search history.

(56) References Cited

U.S. PATENT DOCUMENTS

| 5,570,903 | A | 11/1996 | Meister et al. |
|---|---|---|---|
| 5,983,147 | A | 11/1999 | Krumm |
| 6,282,473 | B1 | 8/2001 | Steffens, Jr. |
| 6,330,501 | B1 | 12/2001 | Breed et al. |
| 6,697,723 | B2 * | 2/2004 | Olsen et al. ............... 701/45 |
| 7,088,113 | B2 * | 8/2006 | Basir et al. .............. 324/663 |
| 2003/0149530 | A1 * | 8/2003 | Stopczynski ............ 701/301 |
| 2003/0204295 | A1 * | 10/2003 | Thompson et al. ......... 701/45 |
| 2006/0095183 | A1 * | 5/2006 | Schuller et al. ............ 701/45 |

FOREIGN PATENT DOCUMENTS

| DE | 380 90 74 | 10/1989 |
|---|---|---|
| DE | 195 46 297 | 6/1997 |
| DE | 198 48 615 | 5/1999 |
| DE | 100 47 190 | 5/2002 |
| DE | 100 51 312 | 7/2002 |

* cited by examiner

*Primary Examiner*—Tan Q. Nguyen
(74) *Attorney, Agent, or Firm*—Kenyon & Kenyon LLP

(57) ABSTRACT

A method and a system in the classification of objects occupying a seat, in particular for the reliable control of the triggering of restraint systems in motor vehicles. Utilized are the dynamics of a person seated on the seat, based on the acceleration forces acting on the person. Using the variables of these forces and the force exerted on the seat cushion of the seat by the mass of the person and its change, there is a determination, as a redundant variable, the mass, the location of the center mass and other physical variables and these are used for the reliable classification.

12 Claims, 1 Drawing Sheet

METHOD AND SYSTEM IN THE CLASSIFICATION OF OBJECTS OCCUPYING A SEAT

FIELD OF THE INVENTION

The present invention relates to a method and a system in the classification of objects occupying a seat, in particular for the classification-dependent triggering of restraint systems in motor vehicles.

BACKGROUND INFORMATION

To protect the occupants of a motor vehicle in accidents, seats of the motor vehicles have been provided not only with reversible restraint arrangements such as safety belts, but also with irreversible restraint arrangement such as airbags, which are triggered, for example pyrotechnically fired, when a collision is detected.

However, faulty firing or firing at the wrong time, even if an accident has occurred, may result in serious injuries that would not occur if the airbag were not fired or, in the case of multistage airbags, were fired in some other way. Furthermore, unnecessary firing must be avoided, especially when the seat is not occupied or is occupied only by an object and not a person.

U.S. Pat. No. 5,570,903 discusses systems for detecting child seats by sensors arranged in the seat surface, for example, or to detect the occupation state, as in U.S. Pat. No. 5,983,147, by video monitoring, for instance.

However, this is still not sufficient. Instead, to avoid disadvantageous and sometimes even dangerous triggering in particular situations, it must be ascertained whether a person occupying the seat is tall or short, heavy or light, is close to the instrument panel or is leaning back in the seat. Depending on the individual situation, the restraint arrangement must be triggered in a variety of ways once an accident occurs, which applies in particular to an airbag able to be fired in several stages, again especially in the case of an airbag for a front-seat passenger. A division into groups, i.e., a classification, has shown to be sufficient.

For this purpose, the so-called OC system (occupant classification system) has been developed. This system is based on an empirically determined correlation between the body weight and the spacing of the ischiadic tubers of a person. As a result, a pressure profile may be acquired and analyzed with the aid of pressure sensors, which are arranged in a matrix-like manner in a seat. This analysis, first of all, also allows or provides for detecting whether or not the seat is occupied. Furthermore, a distinction may be made whether a child seat or some other object or a person is in an occupied seat.

If a person has been detected as object, a further classification may take place by a corresponding analysis of the pressure profile on the basis of empirical findings that correspond to the body size and the body weight of the seated person. Furthermore, using suitable sensors, the absolute weight of the object in the seat may be detected. For example, the weight of the seat with the object may be measured with the aid of foil strain gauges, for instance. On the other hand, the pressure differential between an occupied and an unoccupied seat using a sensor such as a pressure foil, installed in the seat itself, may be detected, thereby detecting the absolute weight of the object.

The conventional classification utilizes empirical findings, which in individual cases, which are of interest here, may provide wrong results in the control of the triggering of the restraint arrangement, however.

SUMMARY OF THE INVENTION

Using this point of departure, it is thus an object of the exemplary embodiment and/or exemplary method of the present invention to improve the accuracy of a classification.

Furthermore, it is an object of the exemplary embodiment and/or exemplary method of the present invention to provide a system for carrying out or performing a corresponding method.

The exemplary embodiment and/or exemplary method of the present invention, first of all, is based on the finding that higher redundancy of the ascertained variable results in the desired improvement. Furthermore, the exemplary embodiment and/or exemplary method of the present invention builds on the finding that, due to the dynamics of a motor vehicle, an object in the examined seat is also exposed to forces acting on the object in a dynamic manner. Furthermore, these dynamic forces are measurable, that is, ascertainable as to their magnitude. On the basis of known physical laws, knowledge of these forces and the type of positional change of the object caused by these forces allow very accurate conclusions to be drawn regarding physical variables of the object, in particular a person seated in the seat, such as mass, height of the center mass (over the seat), height/width ratio of this center mass.

These variables increase the redundancy in the determination of relevant variables on the basis of which the control of the trigger means is implemented when an accident has occurred. In particular the discrimination and, as the case may be, the classification of the person occupying a seat, is improved with respect to the variables that are important for the control of the trigger means. To this end, conventional and possibly already installed passenger compartment systems may be used to determine the (additional) variables that are relevant in this context, so that no or only a few new additional sensors are required. Such detection systems in the passenger compartment are video monitoring, detection of the absolute weights by means of foil strain gauges, ultrasound detection, radar systems, an OC grid mat and the like.

German patent application no. 100 51 312.3 (filed in Germany on Oct. 17, 2000), and assigned to Bosch GmbH) discusses a system and method for detecting the dynamics of a pressure profile exerted on the seat by a seated person and to derive therefrom a dynamic factor that indicates whether the object or the person is stationary or moving. This information allows an evaluation whether the dynamic factor originates with a rigid object or a person because they have different dynamic characteristics, in this way allowing this information to be considered in the decision whether or not a trigger means should be triggered.

DETAILED DESCRIPTION

Figure 1:
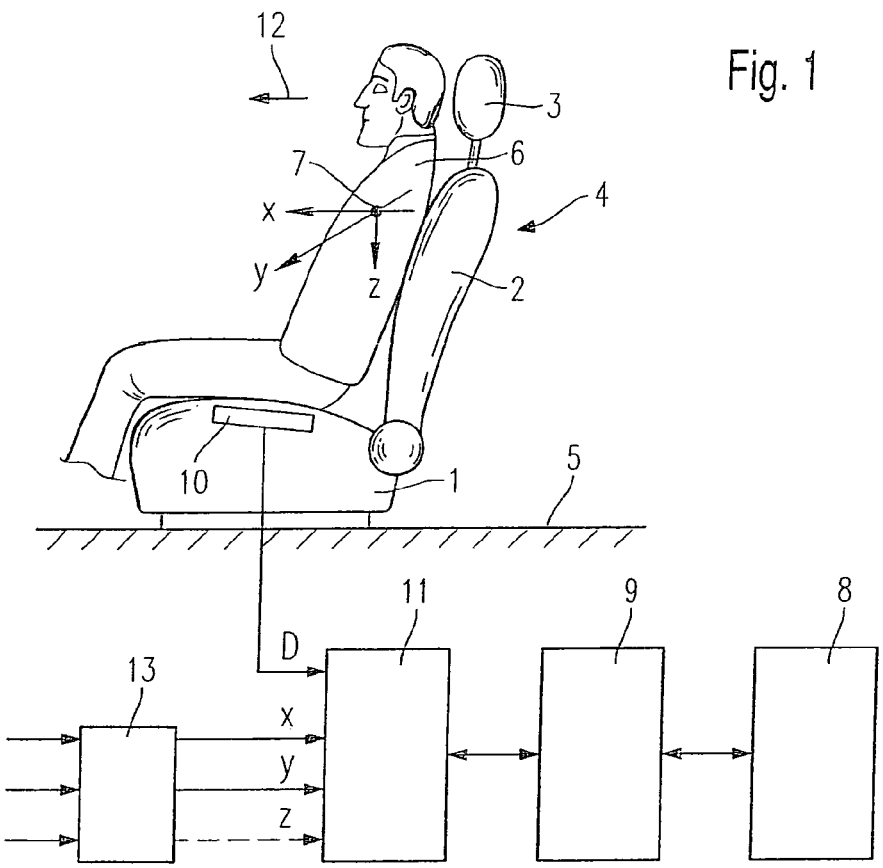
FIG. 1 shows a schematic illustration of a system for implementing the measures of the exemplary embodiment and/or exemplary method of the present invention.

FIG. 1 shows a seat 4 made up of a seat cushion 1, a backrest 2 and a head restraint 3, the seat being located in a schematically shown motor vehicle 5. Furthermore, FIG. 1 shows as an object a person 6 seated in seat 4 and schematically shows center mass 7 of this person 6. In a manner known per se, seat 4 is assigned restraint systems so as to protect person 6 in the event of an accident or some other dangerous situation. Irreversibly triggerable restraint systems 8, such as airbags, pyrotechnically ignitable seat-belt tighteners and the like, are schematically illustrated by a block. These restraint systems 8 are triggered or fired via a triggering device 9 as soon as a dangerous situation for person 6 must be assumed on the basis of recorded and ascertained criteria.

As is generally known per se and will not be discussed in more detail, it is initially ascertained whether seat 4 or its seat cushion 1 is occupied in the first place, for no triggering of restraint systems 8 via control device 9 will be considered when seat 4 is not occupied.

Furthermore, it is essential that restraint systems 8 be triggered only when a person 6 is in seat 4, but not when an object, such as a child seat, is occupying seat 4. The discrimination between a person 6 occupying seat 4 and an object occupying seat 4 may be realized, for example and in particular, in that the pressure distribution exerted on seat cushion 1—the pressure profile—is recorded, which is schematically illustrated in FIG. 1 by a pressure sensor 10. A person 6 acts on seat cushion 1 and thus pressure sensor 10 via two spaced ischiadic tubers, whereas objects, also child seats, act on pressure sensor 10 by a very different pressure profile.

Such a pressure profile is able to be ascertained by at least two, or three or four individually spaced pressure sensors in seat 4 or seat cushion 1. A matrix arrangement of pressure sensors in the sense of a so-called OC mat is particularly advantageous.

Incidentally, signal D or a group of signals corresponding to such a pressure profile also allows to ascertain the occupation state of seat 4 as such in a conventional manner and also to determine the mass acting on seat 4 or seat cushion 1, for example according to vertical force component z acting at center mass 7 of the (non-moving) person 6.

For example, from the spacing of the ischiadic tubers, which may be ascertained by means of pressure sensor 10, and this weight component, i.e., z-component, it is already possible on the basis of empirical data to draw conclusions as to the size of person 6 or the height of center mass 7 of person 6, that is to say, a classification is able to be implemented.

This means that signal D allows a trigger circuit 11 to utilize signals corresponding to the mass of person 6 and/or center mass 7 of person 6 for the calculation of control signals for trigger device 9, either alone or also together with other signals. In the latter case, the redundancy is already improved.

According to the exemplary embodiment and/or exemplary method of the present invention, a very precise determination of the position of center mass 7 of person 6 is possible when the acceleration of person 6, and thus in particular its center mass 7, is detected at least qualitatively in a horizontal plane. In the event of an impact against an obstacle, person 6, and thus its center mass 7, is subjected to a dynamic movement represented by an arrow 12. This movement may be considered unbraked in the horizontal plane and thus be equated with the acceleration of vehicle 5 determined with the aid of vehicle-side sensors.

That is to say, using at least two acceleration sensors in a horizontal plane in vehicle 5 (not individually shown), it is possible to determine the dynamic movement, i.e., the acceleration movement, of person 6 or its center mass 7 in a horizontal plane. This is schematically illustrated in FIG. 1 by an x-component and a y-component.

In FIG. 1, this is also shown schematically in that a computing circuit 13 receives external signals such as from corresponding acceleration sensors and utilizes these to calculate the x- and y-components, evaluates them and transmits them to trigger circuit 11. A dashed line indicates that such sensors may possibly ascertain the z-component as well (in addition). As mentioned, this z-component may also be ascertained on the basis of signal D.

The dynamics of person 6 represented by arrow 12 thus determine the type of position change of person 6 in response to externally acting forces. If these forces are known in their magnitude as well, the actually present position of person 6 and its center mass 7 may be determined extremely precisely (cf., for example, Gillespie, T. D., Fundamentals of Vehicle Dynamics, Society of Automotive Engineers Inc., Warendale, U.S.A., 1992, and/or Kuypers, F., Klassische Mechanik (Classic Mechanics), 3rd edition, VHC Verlagsgesellschaft mbH, Weinheim, 1990). These may then be utilized, in the sense of a detection that is improved via redundancy, in the classification for the purpose of triggering restraint systems 8.

Together with other variables, in any event, the mass, height of center mass 7, and also the height/width ratio of center mass 7, essentially even redundantly, (width in this case representing a measure for the in particular lateral displacement of the center mass in a tilting movement), may be determined, and then used for a classification so as to achieve the most optimal triggering of restraint system 8, especially an airbag, with the aid of control device 9 as a function of the individual dangerous situation.

Figure 2:
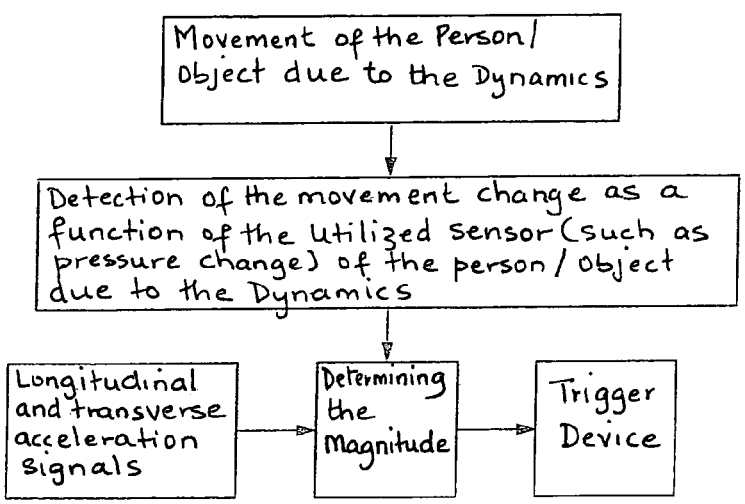
FIG. 2 shows a schematic block diagram of the function of the measures of the exemplary embodiment and/or exemplary method of the present invention.

The afore-discussed functional principle is shown again in FIG. 2.

Since the signals required for the mentioned utilization of the dynamics of person 6 are normally already ascertained in the vehicle, additional sensors are also no longer required.

What is claimed is:

1. A method for classifying an object occupying a seat, for a classification-dependent triggering of a restraint system in a motor vehicle, the method comprising:

determining, based on a signal of at least one acceleration sensor that senses acceleration of the vehicle, first forces acting on the object in a horizontal plane as to their magnitude;

determining, based on a signal of at least one pressure sensor, second forces exerted on the seat by the object in a direction that is perpendicular to the horizontal plane as to their magnitude;

determining, based on the determined magnitudes of the first and second forces, physical variables of the object, the physical variables including a position of a center of mass of the object with respect to each of three axes, each of the axes being perpendicular to the other two of the axes; and using the determined physical variables to classify the object.

2. The method of claim 1, the physical variables of the object further include at least one of a mass, a weight and a height/width ratio of the center of mass of the object.

3. The method of claim 1, wherein other characteristic quantities of the object are also used to classify the object.

4. The method of claim 1, wherein the determined forces include external dynamic forces acting on the object.

5. The method of claim 1, wherein, based on the forces exerted on the seat in the perpendicular direction and their distribution in the seat, whether the object is a person is determined, and wherein the classification of the object is performed only if the object has been determined to be a person.

6. The method of claim 5, wherein a pressure profile acting on one of the seat and a seat cushion is determined, recorded, and used for the determination of whether the object is a person.

7. The method of claim 1, wherein a change over time of the first forces is determined and the physical variables of the object is determined based on the determined change over time of the first forces.

8. A system for classifying an object occupying a seat, for a classification-dependent triggering of a restraint system in a motor vehicle having acceleration sensors in the vehicle comprising:
a first determining arrangement to determine:
first forces acting on the object in a horizontal plane as to their magnitude, the first forces being determined based on a signal of the acceleration sensors; and
second forces exerted on the seat by the object in a direction that is perpendicular to the horizontal plane as to their magnitude, the second forces being determined based on a signal of at least one pressure sensor; and
a second determining arrangement to determine based on the determined magnitudes of the first and second forces, physical variables of the object, the physical variables including a position of a center of mass of the object with respect to each of three axes, each of the axes being perpendicular to the other two of the axes; and
an arrangement using the determined physical variables to classify the object.

9. The system of claim 8, wherein the at least one pressure sensor includes at least two sensors, arranged in the seat with clearance and wherein the first determining arrangement determines a for pressure profile of the object.

10. The system of claim 9, wherein the at least one pressure sensor includes at least three sensors.

11. The system of claim 9, wherein the at least one pressure sensor includes at least four sensors.

12. The system of claim 9, wherein the at least one pressure sensor includes a matrix arrangement of six sensors.

* * * * *